US 6,583,956 B2

(12) United States Patent
Kikuchi et al.

(10) Patent No.: US 6,583,956 B2
(45) Date of Patent: Jun. 24, 2003

(54) DISC CARTRIDGE

(75) Inventors: Shuichi Kikuchi, Miyagi (JP); Rie Izu, Miyagi (JP)

(73) Assignee: Sony Corporation, Tokyo (JP)

( * ) Notice: Subject to any disclaimer, the term of this patent is extended or adjusted under 35 U.S.C. 154(b) by 98 days.

(21) Appl. No.: 09/801,587

(22) Filed: Mar. 8, 2001

(65) Prior Publication Data

US 2001/0021084 A1 Sep. 13, 2001

(30) Foreign Application Priority Data

Mar. 9, 2000 (JP) ....................................... 2000-071077

(51) Int. Cl.[7] ................................................ G11B 23/03
(52) U.S. Cl. ........................................ 360/133; 369/291
(58) Field of Search ............................ 360/133; 369/291

(56) References Cited

U.S. PATENT DOCUMENTS

| | | | |
|---|---|---|---|
| 4,358,801 A | 11/1982 | Faber et al. | |
| 4,412,260 A | 10/1983 | Stricklin et al. | |
| 4,497,009 A | * 1/1985 | Oishi et al. ................ | 360/133 |
| 4,724,962 A | * 2/1988 | Watanabe et al. .......... | 360/133 |
| 4,740,949 A | 4/1988 | Davis | |
| 5,048,008 A | * 9/1991 | Haruna ...................... | 369/291 |

FOREIGN PATENT DOCUMENTS

| | | | |
|---|---|---|---|
| EP | 0 973 163 | | 1/2000 |
| JP | 63-269387 A | * | 11/1988 |
| JP | 8-87855 A | * | 4/1996 |

* cited by examiner

*Primary Examiner*—William Klimowicz
(74) *Attorney, Agent, or Firm*—Frommer Lawrence & Haug LLP; William S. Frommer; Leonard J. Santisi (57) ABSTRACT

To easily know a correct direction of insertion into a recorder/player and assure a large width of an access opening through which the optical head approaches an optical disc, a disc cartridge is provided which includes an access opening (21) formed in a cartridge body (6) and through which a part of the recording area of an optical disc (5), extending between lead-in and lead-out areas, is exposed outside for data read and write, a pair of shutter members (25), (26) provided movably towards and away from each other to open and close the access opening (21); and a shutter open/close mechanism (27) having a pair of guide recesses (36*a*) and (36*b*) formed in a main side the of the cartridge body (6) obliquely in relation to the width of the cartridge body (6) to support the pair of shutter members (25) and (26), respectively, to be movable.

6 Claims, 12 Drawing Sheets

FIG.1

(PRIOR ART)

DISC CARTRIDGE

BACKGROUND OF THE INVENTION

1. Field of the Invention

The present invention relates to a disc cartridge having encased therein a disc-shaped recording medium such as an optical disc, magneto-optical disc or the like.

2. Description of the Related Art

As the disc-shaped recording medium, a disc cartridge having a magneto-optical disc for example encased therein has been proposed.

Figure 1:
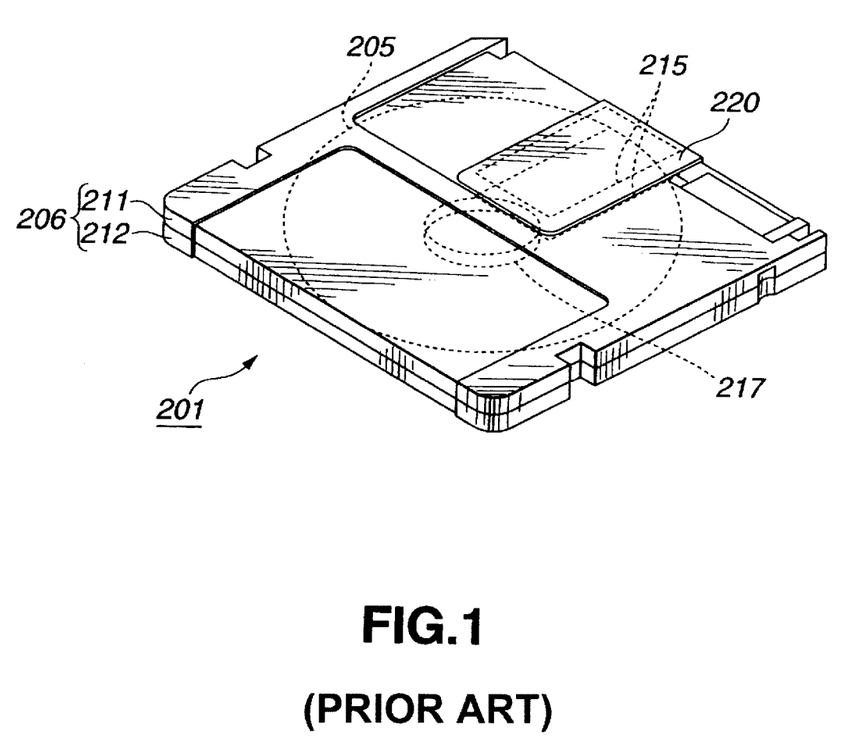
FIG. 1 is a perspective view of a conventional disc cartridge.

Referring now to FIG. 1, there is schematically illustrated a conventional disc cartridge in the form of a perspective view. In FIG. 1, the disc cartridge is generally indicated with a reference 201. The disc cartridge 201 includes a cartridge body 206 consisting of a pair of upper shell 211 and lower shell 212 assembled to each other. These upper and lower shells 211 and 212 are made of a resin material. Each of the upper and lower shells 211 and 212 has formed therein an access opening 215 having a generally rectangular shape. The access openings 215 are opposite to each other. Thus, a part of the recording area of the magneto-optical disc 205, extending between lead-in and lead-out areas, is exposed outside through the openings 215 for data read and write.

The lower shell 212 of the cartridge body 206 has formed therein adjacent or next to the access opening 215 and a drive opening 217 through which a disc table (not shown) of a disc drive mechanism which drives to rotate the magneto-optical disc 205 comes into the cartridge body 206.

Further, the cartridge body 206 has a shutter member 220 mounted thereon as shown in FIG. 1. Normally, the shutter member 220 covers or closes the access openings 215 and drive opening 217. When the disc cartridge 201 is loaded into a recorder/player, the shutter member 220 will be moved and thus the access and drive openings 215 and 217 will be opened. The shutter member 220 consists of an upper shutter portion which closes and opens the access opening 215 in the upper shell 211, a lower shutter portion which closes and opens the access openings 215 and drive opening 217 in the lower shell 212, and a connection to which each of the upper and lower shutter portions is connected at one end thereof.

When the disc cartridge 201 constructed as in the above is loaded into the recorder/player, the shutter member 220 is moved by a shutter open/close member of the recorder/player to open the access openings 215 and drive opening 217. The disc table of the disc drive mechanism (not shown) of the recorder/player comes into the disc cartridge through the drive opening 217 to rotate the magneto-optical disc 205 in the disc cartridge 201, while the write/read head of the recorder/player comes into the disc cartridge 201 through the access openings 215 to write/read information to/from the magneto-optical disc 205.

In the aforementioned conventional disc cartridge 101, however, since the front end thereof at which the disc cartridge 201 is first inserted into and removed from the recorder/player is formed straight perpendicularly to the direction of insertion into the recorder/player and both the main sides of the cartridge body 206 are formed generally square, it is difficult to easily know the correct inserting direction of the disc cartridge 201 from its appearance.

Therefore, the conventional disc cartridge 201 is likely to be inserted in a wrong direction into the recorder/player.

In the conventional disc cartridge 201, the width of the access openings 215 should desirably be larger for accommodating any write/read head of the recorder/player which will vary from one type of the recorder/player to another. However, if the width of the access openings 215 in the disc cartridge 201 is thus made larger, the upper and lower shutter portions of the shutter member 220 will be larger and the shutter member 220 is moved over a longer distance, which will disadvantageously result in a larger size of the cartridge body 206 or in protrusion of the shutter member 220 to outside the cartridge body 206 when the access openings 215 are opened. Therefore, in the conventional disc cartridge 201, the access openings 215 cannot be designed large.

OBJECT AND SUMMARY OF THE INVENTION

It is therefore an object of the present invention to overcome the above-mentioned drawbacks of the prior art by providing a disc cartridge having a body whose front end to be opposite to a recorder/player may be designed to have an arbitrary shape for easy knowing of a correct direction of insertion into the recorder/player and provided with a shutter open/close mechanism assuring a large width of an access opening for write and/or read to and/or from a disc encased in the disc cartridge.

The above object can be attained by providing a disc cartridge including according to the present invention a disc-shaped recording medium; a cartridge body having formed therein a disc compartment to house the disc-shaped recording medium; an access opening formed in the cartridge body and through which a part of the recording area of the disc-shaped recording medium, extending between lead-in and lead-out areas, is exposed outside for data read and write; a pair of shutter members provided movably towards and away from each other to open and close the access opening; and a shutter open/close mechanism having a pair of guide recesses formed in a main side the of the cartridge body to be oblique in relation to the width of the cartridge body to support the pair of shutter members, respectively, to be movable.

In the disc cartridge constructed as in the above, the pair of shutter members is moved towards and away from each other along the pair of guide recesses formed in the main side of the cartridge body to be oblique relative to the width of the cartridge body ti open and close the access opening. Therefore, in this disc cartridge, since the pair of shutter members is moved towards and away from each other in relation to the access opening, it is possible to assure a large width of the access opening.

In the above disc cartridge according to the present invention, the guide recess formed on a main side of the cartridge body to be oblique relative to the width of the cartridge body allows the front end of the cartridge body at which the disc cartridge is first inserted into the recorder/player to be formed in an arbitrary shape for easily knowing a correct direction of insertion in the recorder/player, so that the disc cartridge can be prevented from being inserted in a wrong direction into the recorder/player. Also, in this disc cartridge, the pair of shutter members provided allows to design a large width of the access opening and also can be moved positively relative to the access opening.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 2:
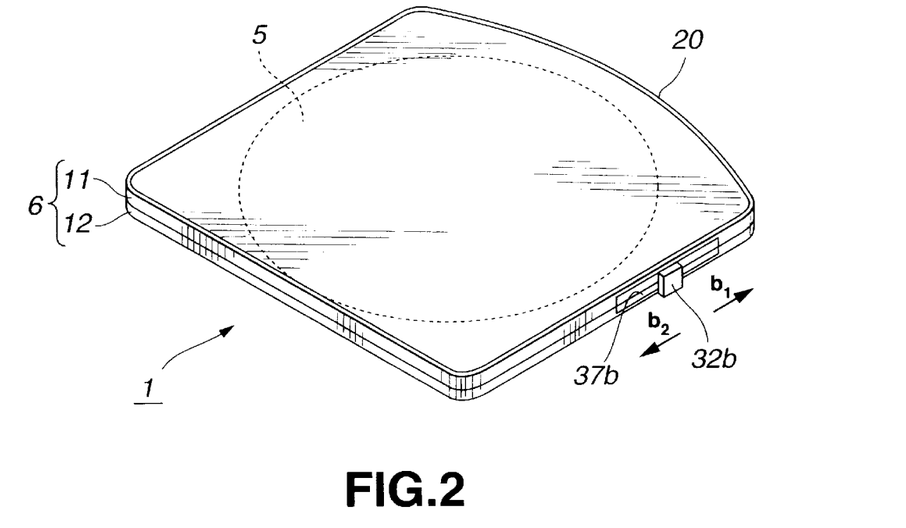
FIG. 2 is a perspective view of an embodiment of the disc cartridge according to the present invention.
Figure 3:
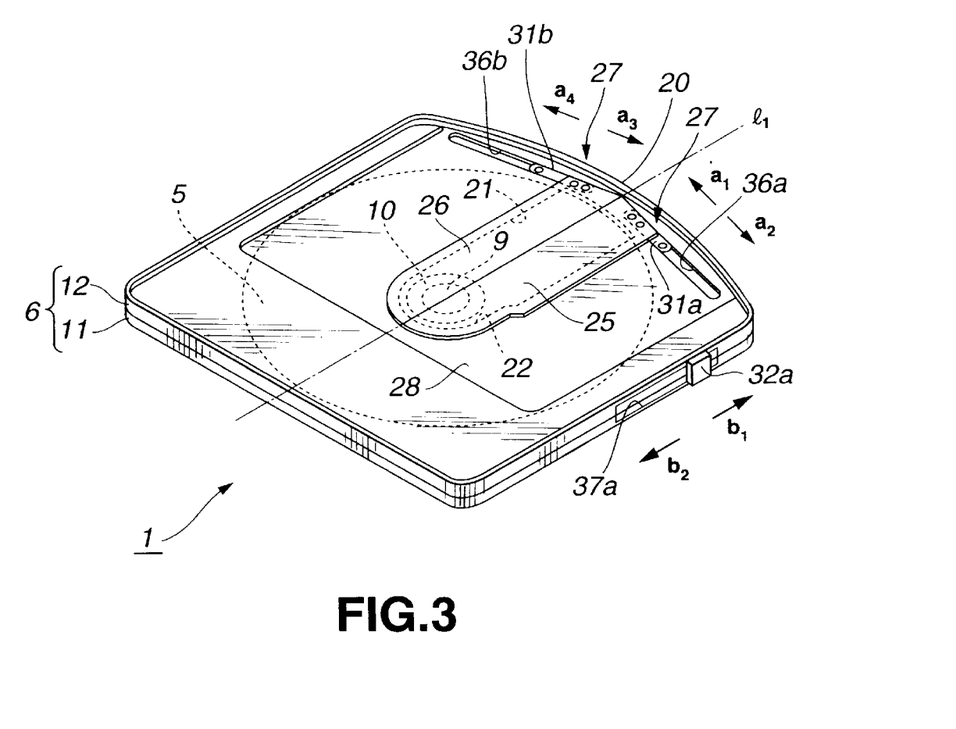
FIG. 3 is a perspective bottom view of the disc cartridge in FIG. 2.

Referring now to FIGS. 2 and 3, there is schematically illustrated in the form of a perspective view the embodiment of the disc cartridge according to the present invention. The disc cartridge is generally indicated with a reference 1. As shown, the disc cartridge 1 includes an optical disc 5 and a cartridge body 6 having the optical disc 5 rotatably encased therein.

Figure 4:
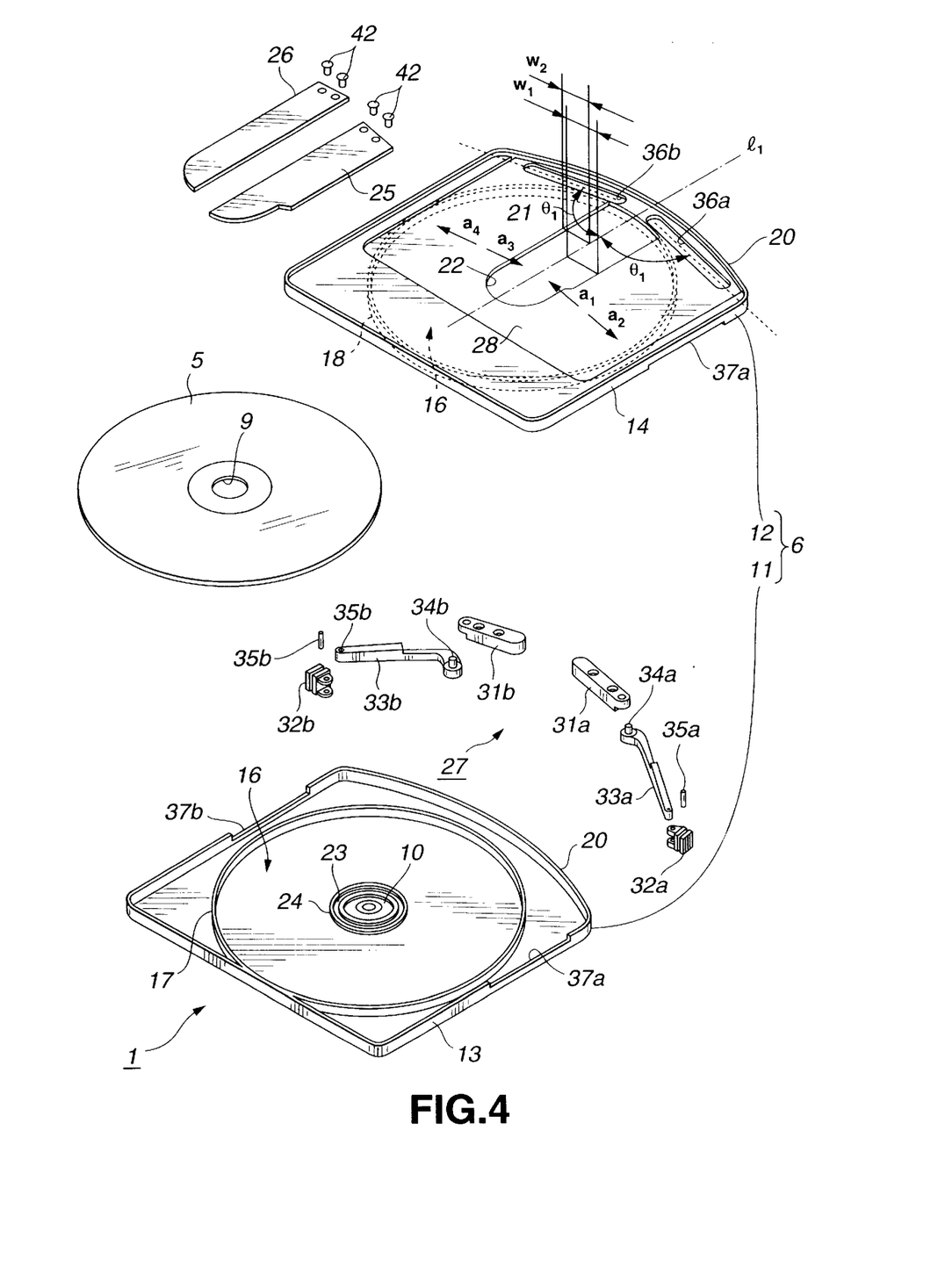
FIG. 4 is an exploded perspective bottom view of the disc cartridge in FIG. 2.

As will seen from FIGS. 2, 3 and 4, the optical disc 5 is formed to have a disc-like form having a central hole 9. The optical disc 5 used herein is a CD (compact disc)-R (recordable) to which information can additionally be written, for example. It should be noted that the optical disc 5 may of course be an other optical disc such as a phase-change optical disc, DVD (digital versatile disc), magneto-optical disc or the like, which are CD-RW (rewritable) in which information can be rewritable.

As shown in FIGS. 3 and 4, the cartridge body 6 consists of a pair of upper shell 11 and lower shell 12, assembled to each other. The upper and lower shells 11 and 12 are formed in the general shape of a box by injection molding of a resin such as polycarbonate. Note that the upper and lower shells 11 and 12 may be formed, in addition to polycarbonate, from a thermoplastic resin such as polystyrene, high-impact polystyrene, acryl styrol, acryl butyl styrol, polypropylene, denatured PPO (polyphenylene oxide) or the like.

As best shown in FIG. 4, the upper shell 11 and lower shell 12 has upright walls 13 and 14 formed along the respectively circumferences thereof. The upright circumferential walls 13 and 14 are made to abut each other to form the circumferential wall of the cartridge body 6 as shown in FIG. 4.

Figure 5:
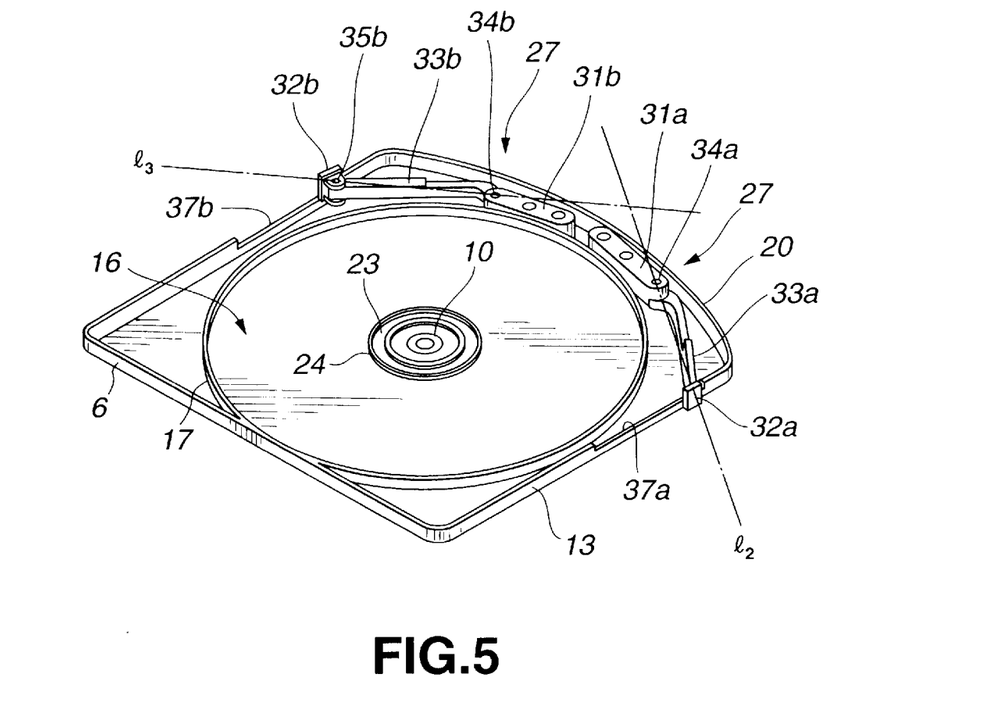
FIG. 5 is a perspective view for explanation of the shutter open/close mechanism.

As shown in FIGS. 4 and 5, each of the upper and lower shells 11 and 12 has formed in the inner side thereof a circular disc compartment 16 whose diameter is slightly larger than that of the optical disc 5 and in which the optical disc 5 is rotatably housed. The disc compartment 16 is formed, as shown in FIGS. 4 and 5, by assembling circular upright walls 17 and 18 formed on the inner sides of the upper and lower shells 11 and 12. The upright walls 17 and 18 are generally as high as the circumferential upright walls 13 and 14 of the upper and lower shells 11 and 12. Thus, the upright circular walls 17 and 18 of the disc compartment 16 isolate the inner space of the cartridge body 6 in which the optical disc 5 is housed from the other inner space.

Of the circumferential upright walls 13 and 14 of the upper and lower shells 11 and 12, only front ends 20 at which the disc cartridge 1 is to be first inserted into a recorder/player are formed generally circular as shown in FIGS. 2, 3 and 4. Therefore, seeing the front end 20 of the cartridge body 6 when going to load the disc cartridge 1 into the recorder/player, he will easily know visually and by touching in which direction he should insert the disc cartridge into the recorder/player. Namely, the user will not insert the disc cartridge 1 in any wrong direction into the recorder/player. Note that the front end 20 may be formed to have a polyhedral shape or to be a combination of a curve and plane.

Also, the lower shell 12 has formed in the main side thereof a generally rectangular access opening 21 through which a write/read mechanism (not shown) of the recorder/player is to face the optical disc 5, as shown in FIGS. 3 and 4. As shown in FIG. 4, the access opening 21 is formed asymmetrical with respect to a center line $l_1$ of the width of the cartridge body 6. More specifically, the access opening 21 is formed to have an area to the right of the center line $l_1$ and an area to the left of the center line $l_1$, and the right area of the access opening 21 has a width $w_1$ and the left area has a width $w_2$, as shown in FIG. 4. The width $w_1$ is a little larger than the width $w_2$.

Figure 12:
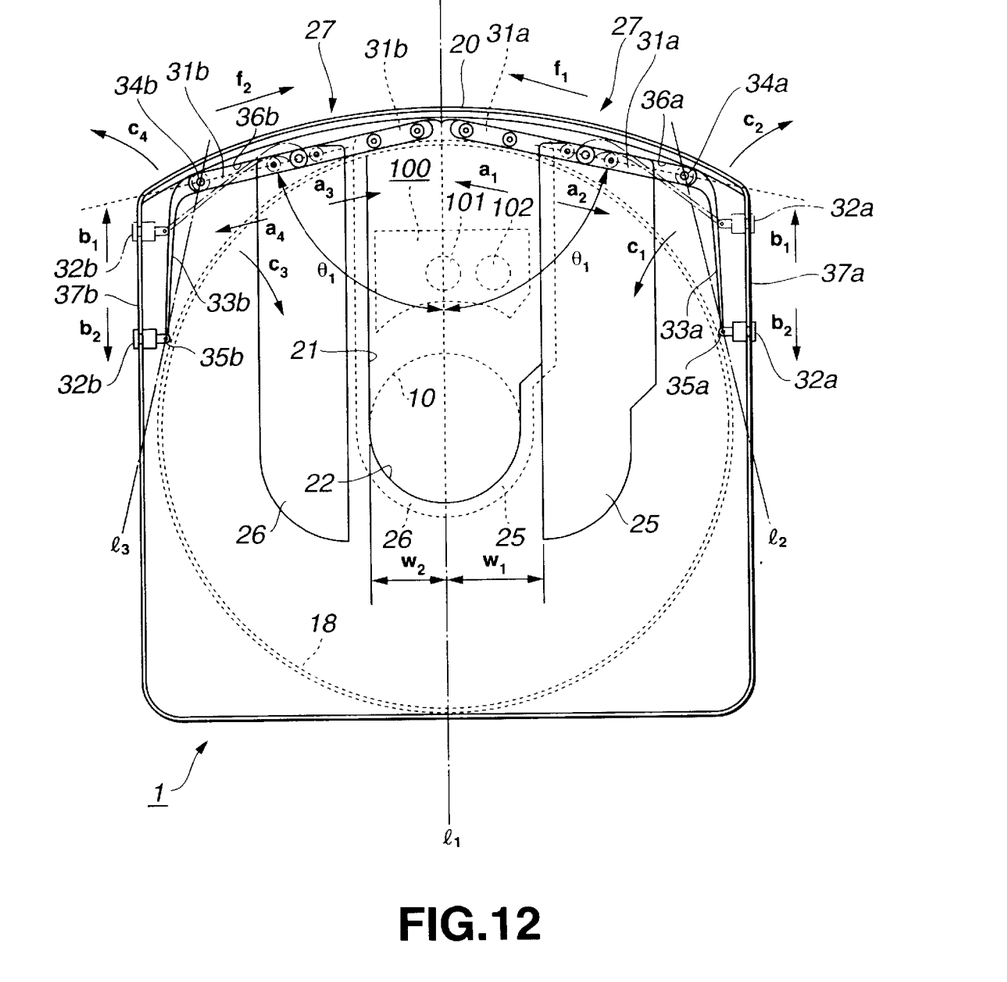
FIG. 12 is a plan view of the shutter open/close mechanism, showing each shutter plate at its opened position.

Some of the recorder/player capable of playing the optical disc 5 in the disc cartridge 1 have an optical pickup having a plurality of objective lenses for dealing with a plurality of types of optical discs. For example, in an optical pickup 100 provided in the recorder/player as shown in FIG. 12, a first objective lens 101 is disposed on the center line $l_1$ while a second objective lens 102 is disposed in a position deviated a predetermined distance in the direction of width in relation to center lines $l_2$ and $l_3$. That is, the optical pickup 100 is formed asymmetrical with respect to the center line $l_1$ since the first and second objective lenses 101 and 102 are disposed side by side in the direction of the width of the access opening 21.

Therefore, since the width $w_1$ of the right area with respect to the center line $l_1$ is larger than the width $w_2$ of the left area the aforementioned access opening 21 is aligned with the optical pickup 100 of the recorder/player and thus the optical pickup 100 can be moved into the access opening 21.

Figure 6:
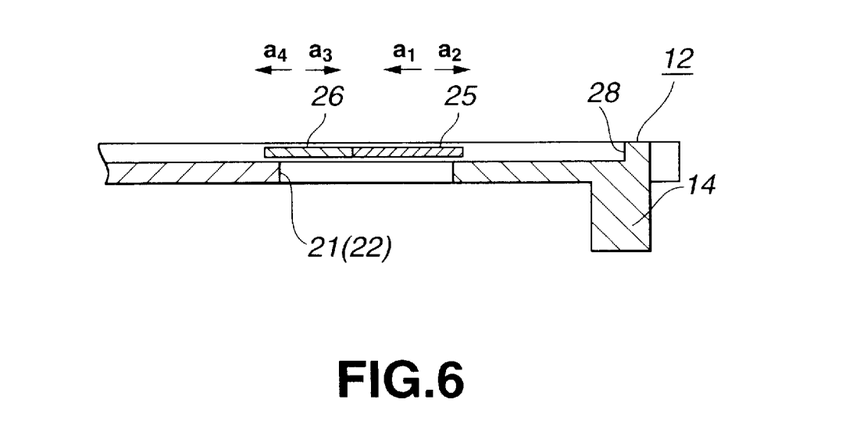
FIG. 6 is an axial sectional view for explanation of the shutter plate and concavity in which the shutter plate is moved.

Further, as shown in FIGS. 3 and 4, the lower shell 12 has formed therein a circular drive opening 22 contiguous to the access opening 21 and through which a disc table (not shown) of a disc drive mechanism of the recorder/player is allowed to enter the cartridge body 6, as shown in FIG. 6.

As shown in FIGS. 4 and 5, the lower shell 12 has formed near the center of the bottom thereof a compartment 23 defined by an annular projection 24, in which a chucking plate 10 is provided to clamp and hold the optical disc 5 at a center hole 9 thereof on the disc table of the recorder/player. The chucking plate 10 is formed from a magnetic metal such as stainless steel or the like to have a generally disc-like shape. It may be formed from iron and plated with nickel, chrome or the like or painted for rust prevention.

The aforementioned upper and lower shells 11 and 12 are assembled and joined to each other by ultrasonic welding for example. Alternatively, the upper and lower shells 11 and 12 may be designed so that they can be joined to each other with fixing screws driven, through prepared holes formed near corners of the main side, for example, of one of the shells, into screw holes formed in corresponding corners of the main side of the other shell and opposite to the prepared holes in the other shell.

Also, as shown in FIGS. 3, 4 and 5, the cartridge body 6 has a pair of shutter plates 25 and 26 provided thereon movably towards and away from each other to open and close the access and drive openings 21 and 22, and a shutter open/close mechanism 27 to support these shutter plates 25 and 26 movably in directions of arrow $a_1$ and $a_2$, and $a_3$ and $a_4$, oblique widthwise of the cartridge body 6.

Figure 7:
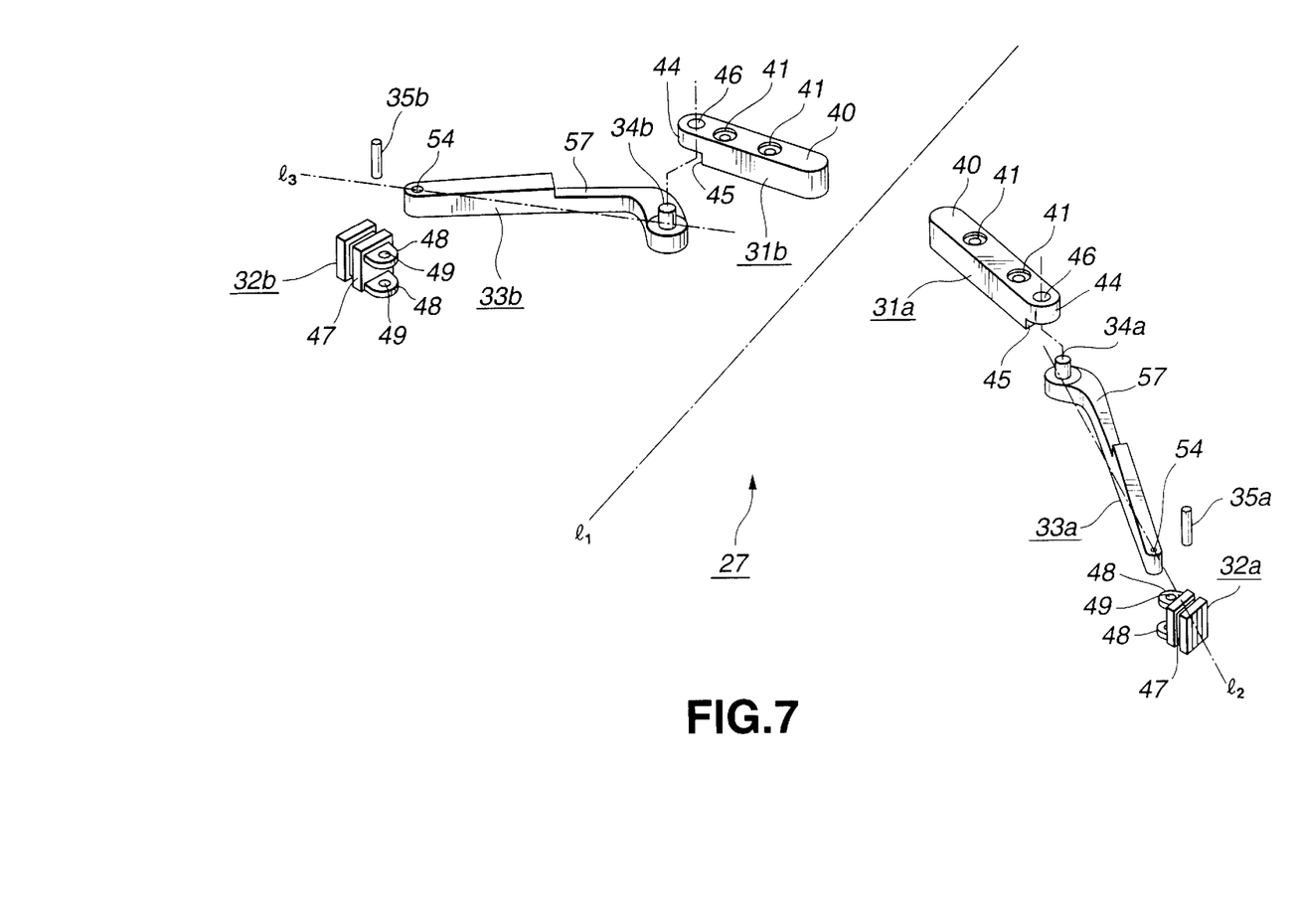
FIG. 7 is an exploded perspective view for explanation of the shutter open/close mechanism.

The shutter plates 25 and 26 are made of a metal such as aluminum and formed flat to have a thickness of about 0.3 mm for example as shown in FIGS. 6 and 7. Note that the shutter plates 25 and 26 may be made of aluminum as the base and coated with Alumite or painted for rust prevention and decoration. Also, the shutter plates 25 and 26 may be formed by punching a thin sheet of stainless steel, polycarbonate, polystyrene, high-impact polystyrene, acryl styrol, acryl butyl styrol or the like, and its thickness is not limited to 0.3 mm but may appropriately be selected depending upon the material used.

As shown in FIGS. 3 and 6, the shutter plates 25 and 26 are formed slightly larger than the access opening 21 and drive opening 22, parted from each other by the center line $l_1$, and asymmetrical with respect to the center line $l_1$, and they are fixed at one end thereof to the shutter open/close mechanism 27.

As shown in FIGS. 5 and 6, the cartridge body 6 has formed in the main side of the lower shell 12 a generally rectangular concavity 28 in which the pair of shutter plates 25 and 26 is disposed movably. As shown in FIG. 6, the concavity 28 is formed to have an area a little larger than an area over which the shutter plates 25 and 26 are moved in relation to the center line $l_1$ to open and close the access opening 21 and drive opening 22 and such a depth slightly larger than the thickness of the shutter plates 25 and 26 that the shutter plates 25 and 26 will not project from the main side of the cartridge body 6.

As will be seen from FIGS. 4 and 5, the shutter open/close mechanism 27 is disposed in the inner space of the cartridge body 6, outside the upright walls 17 and 18 of the disc compartment 16. As shown, the shutter open/close mechanism 27 includes a pair of guide members 31a and 31b to support the shutter plates 25 and 26, respectively, a pair of operating member 32a to move the guide members 31a and 31b, respectively, and a pair of transmission members 33a and 33b linking the guide members 31a and 31b to operating member 32a and 32b, respectively, to transmit an operating force from the operating members 32a and 32b to the guide members 31a and 31b, respectively. These components of the shutter open/close mechanism 27 are provided symmetrically with respect to the center line $l_1$.

Also, as shown in FIGS. 4, 5 and 7, the shutter open/close mechanism 27 includes a pair of first pivots 34a and 34b to support the pair of guide members 31a and 31b, respectively, pivotably, a second pair of pivots 35a and 35b to support the operating member 32a and 32b, respectively, pivotably, a pair of guide recesses 36a and 36b to support the guide members 31a and 31b, respectively, to be movable, and a pair of support surfaces 37a and 37b to support the operating member 32a and 32b, respectively, to be movable.

Figure 8:
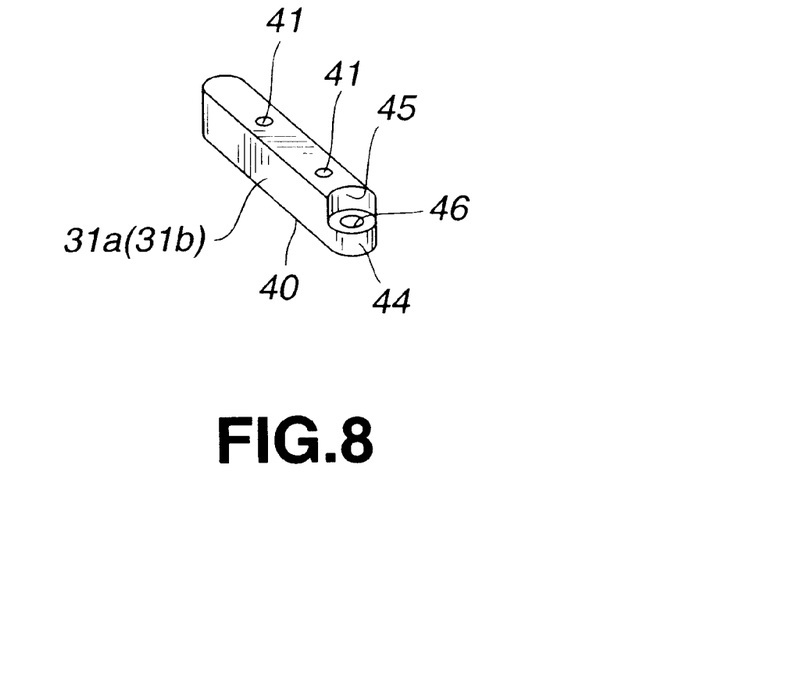
FIG. 8 is a perspective bottom view of a guide member of the shutter open/close mechanism.

As shown in FIGS. 7 and 8, the guide members 31a and 31b are formed from a thermoplastic synthetic resin such as polypropylene to have the shape of a block. The guide members 31a and 31b have formed on one side thereof a mount surface 40 to which the shutter members 25 and 26 are fixed at one end thereof, respectively, with fixing screws 42 driven in screw holes 41 formed also in the mount surface 40.

As shown in FIGS. 7 and 8, the guide members 31a and 31b have one end thereof cut to about a half of their thickness to have a generally circular face 45 corresponding to one end of the transmission members 33a and 33b. Thus the guide members 31a and 31b has integral connecting ends 44, respectively, to which the one ends of the transmission member 33a and 33b are connected pivotably. The connecting ends 44 has formed through them pivot holes 46, respectively, through which the first pair of pivots 34a and 34b are inserted, whereby the transmission members 33a and 33b are connected pivotably to the guide members 31a and 31b, respectively.

Figure 9:
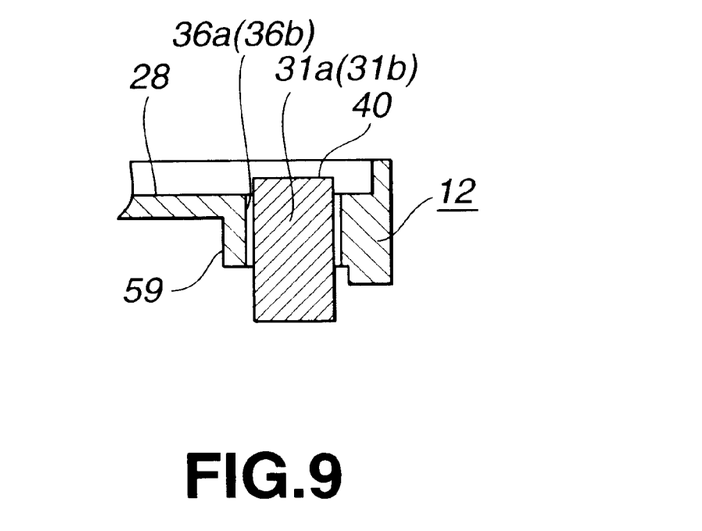
FIG. 9 is an axial sectional view for explanation of the guide member of the shutter open/close mechanism.

The guide member 31a and 31b are movably inserted in the guide recesses 36a and 36b, respectively, so as not to protrude from the concavity 28 to above the main side of the cartridge body 6, as shown in FIG. 9.

Figure 10:
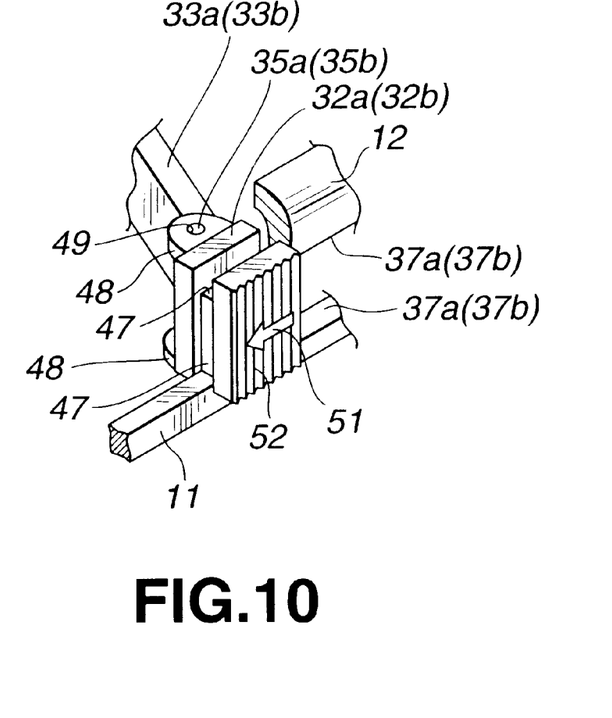
FIG. 10 is a perspective view for explanation of an operating member of the shutter open/close mechanism and shutter locking mechanism.
Figure 11:
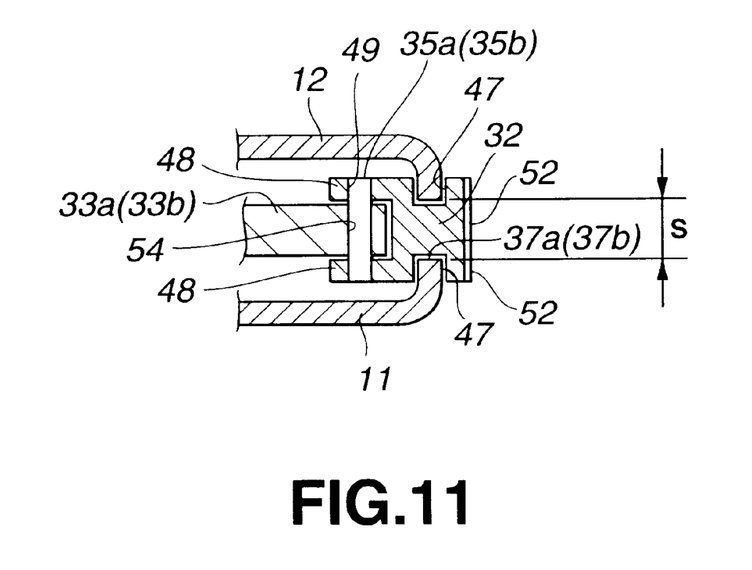
FIG. 11 is an axial sectional view of the operating member.

As shown in FIGS. 7, 10 and 11, the operating members 32a and 32b are formed to have the general shape of a rectangular block. The operating members 32a and 32b have formed therein engagement recesses 47 in which the upper and lower shells 11 and 12 are movably engaged, as shown in FIGS. 10 and 11. Also, as shown in FIGS. 10 and 11, each of the operating members 32a and 32b has formed integrally therewith a pair of support projections 48 supported pivotably on each of the transmission members 33a and 33b. As shown, the support projections 48 have formed therein pivot holes 49 through which the second pivot 35a and 35b are inserted pivotably.

Further, as shown in FIG. 10, the operating members 32a and 32b are disposed outside of the lateral side of the cartridge body 6. Also, as shown in FIG. 10, the operating members 32a and 32b have formed on their outer surfaces thereof, respectively, non-slip recesses 52 to prevent the user's finger or a shutter operating member (not shown) of the recorder/player from slipping on the operating member when moving the operating member. Also, there are provided on the outer surfaces of the operating members 32a and 32b markings 51 such as an arrow indicating the moving directions of the shutter plates 25 and 26 being opened.

As shown in FIG. 9, the transmission members 33a and 33b have formed integrally at one ends thereof the first pivots 34a and 34b, respectively, connected to the guide members 31a and 31b, and integrally at the other ends pivot holes 54 to support the second pivots 35a and 35b, respectively. In the transmission members 33a and 33b, both ends of the second pivots 35a and 35b inserted through the pivot boles 54, respectively, are inserted through the pivot holes 49, respectively, in the support projections 48 of the operating members 32a and 32b and thus the operating members 32a and 32b are pivotably supported. Note that the second pivots 35a and 35b are made of a stainless steel for example.

As shown in FIGS. 5 and 7, each of the transmission members 33a and 33b has a portion thereof near the coupling 44 of each of the guide members 31a and 31b formed circular convexly towards the upright walls 13 and 14 of the cartridge body 6 in relation to straight lines $l_2$ and $l_3$ connecting the centers of pivoting of the first pivots 34a and 34b and those of the second pivots 35a and 35b, respectively. Also as shown in FIG. 12, because of the generally circular portions of the transmission members 33a and 33b, respectively, near the couplings 44 of the guide members 31a and 31b, respectively, operating forces applied to the transmission members 33a and 33b longitudinally of the latter with the operating members 32a and 32b being moved in the direction of arrow $b_1$ when the shutter plates 25 an 26 are moved in the directions of arrow $a_1$ and $a_2$ and arrows $a_3$ and $a_4$, act as components $f_1$ and $f_2$ divided in directions parallel to the moving direction of the guide members 31a and 31b, respectively. Thus, the guide members 31a and 31b can be moved. Note that the transmission members 33a and 33b may have longitudinal intermediate portions thereof formed swelling outwardly of the cartridge body 6.

Also, since the transmission members 33a and 33b have formed therein cuts 57, respectively, to prevent interference with guide walls 59 (which will further be described later) of the guide recesses 36a and 36b, respectively, when the transmission member 33a and 33b are pivoted about the first pivots 34a and 34b or second pivots 35a and 35b, as shown in FIG. 9, they can operate positively.

Figure 13:
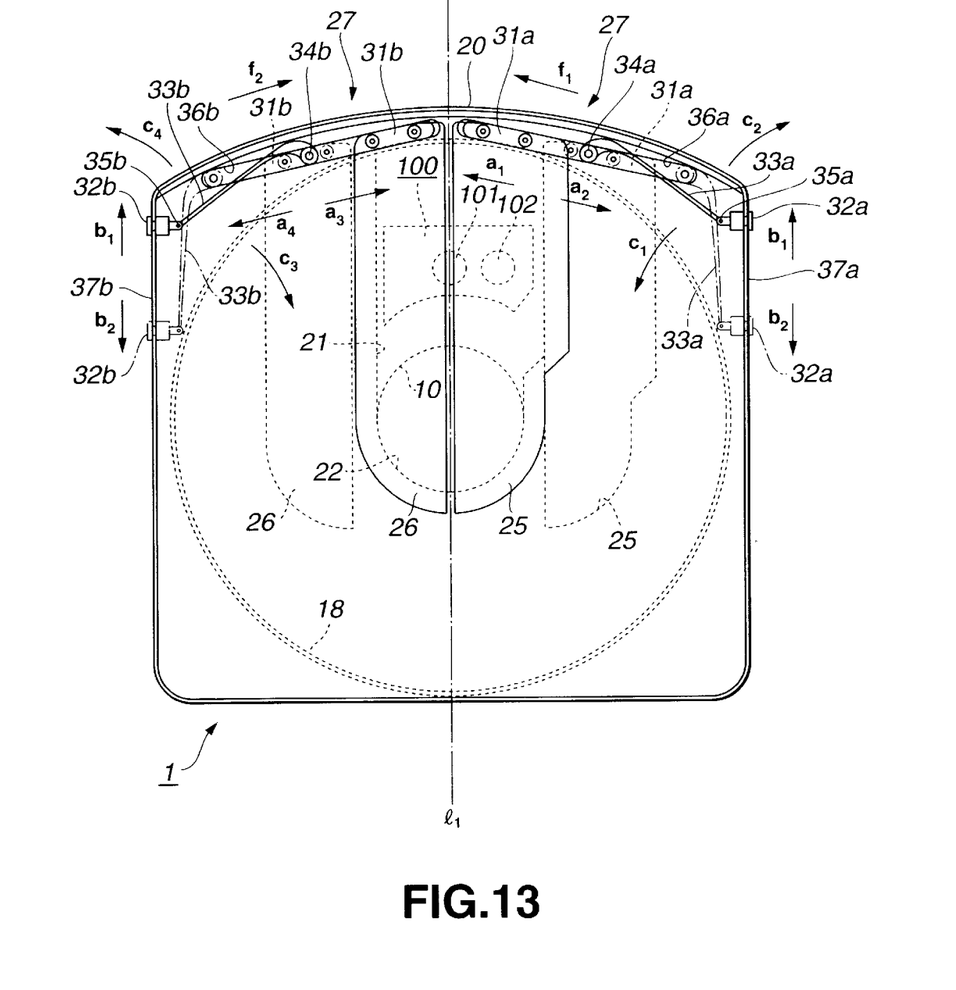
FIG. 13 is a plan view of the shutter open/close mechanism, showing each shutter plate at its closed position.

As shown in FIGS. 4 and 12, the guide recesses 36a and 36b are formed linear in the lower shell 12 obliquely relative to the width of the cartridge body 6, perpendicular to the direction of insertion into the recorder/player. The guide recesses 36a and 36b are formed in positions adjacent to the front end 20 of the lower shell 12 as shown. That is, as shown in FIGS. 12 and 13, the guide recesses 36a and 36b are formed to be oblique with a predetermined angle $é_1$, smaller than 90°, relative to a center line $l_1$ of the width of the cartridge body 6. As shown in FIG. 9, there are formed integrally with and projecting from the circumferences of the guide recesses 36a and 36b, respectively, the guide walls 59 which are in sliding contact with the guide members 31a and 31b. The guide members 31a and 31b are movably inserted at one lateral side thereof in the guide recesses 36a and 36b, respectively, and project somewhat in the shutter moving concavities 28 of the lower shell 12. Also, each of the guide recesses 36a and 36b have a length which is a sum of the length of each of the guide members 31a and 31b and the moving distance of the shutter plates 25 and 26, a little larger than the widths $w_1$ and $w_2$ of the access opening 21 and drive opening 22 in relation to the center line $l_1$.

As shown in FIGS. 4 and 11, the support surfaces 37a and 37b are formed on both the lateral sides of the upper and lower shells 11 and 12, parallel to the direction of insertion into the recorder/player, and they define between the upper and lower shells 11 and 12 predetermined slits s in which the operating members 32a and 32b are movably engaged at the engagement recesses 47, respectively. Also, in the operating members 32a and 32b, the thickness between the bottoms of the engagement recesses 47 is slightly smaller than the slit s of the support surfaces 37a and 37b as shown in FIG. 11.

In the shutter open/close mechanism 27 constructed as in the above, the pair of shutter plates 25 and 26 is moved to open and close the access opening 21 and drive opening 22 as will be described below:

As shown in FIG. 12, in the shutter open/close mechanism 27, when the shutter plate 25 is moved in the direction of arrow $a_2$ while the shutter plate 26 is moved in the direction of arrow $a_4$, thereby opening the access and drive openings 21 and 22, the operating members 32a and 32b are moved in the direction of arrow $b_2$. As the opening members 32a and 32b are moved in the direction of arrow $b_2$, the ends of the transmission members 33a and 33b are pivoted about the second pivots 35a and 35b, respectively, in the directions of arrows $c_2$ and $c_4$, respectively. As the transmission members 33a and 33b are pivoted about the second pivots 35a and 35b, respectively, they will be pivoted about the first pivots 34a and 34b, respectively, to move the guide members 31a and 31b in the directions of arrows $a_2$ and $a_4$, respectively. The guide members 31a and 31b are moved in and along the guide recesses 36a and 36b, respectively, until they abut one ends of the guide recesses 36a and 36b, respectively, and thus stopped. Thus, the shutter plates 25 and 26 are moved to positions where the access and drive openings 21 and 22 are opened.

Also, as shown in FIG. 13, when the shutter open/close mechanism 27 moves the shutter plate 25 in the direction of arrow $a_1$ while moving the shutter plate 26 in the direction of arrow $a_3$, thereby closing the access and drive openings 21 and 22, the operating members 32a and 32b are moved in the direction of arrow $b_1$.

The operating members 32a and 32b being moved in the direction of arrow $b_1$ will have the ends of the transmission members 33a and 33b pivot about the second pivots 35a and 35b, respectively, in the directions of arrows $c_1$ and $c_3$, respectively. Being pivoted about the second pivots 35a and 35b, respectively, the transmission members 33a and 33b are pivoted about the first pivots 34a and 34b, respectively, to move the guide members 31a and 31b in the directions of arrows $a_1$ and $a_3$, respectively. The guide members 31a and 31b are moved in and along the guide recesses 36a and 36b, respectively, until they abut one ends of the guide recesses 36a and 36b, respectively, and thus the shutter plates 25 and 26 are moved to positions where they close the access and drive openings 21 and 22. As shown in FIGS. 3 and 6, the shutters 25 and 26 in pair abut each other at one opposite ends thereof to close the access and drive openings 21 and 22.

When the access and drive openings 21 and 22 are closed by the shutter plates 25 and 26, the transmission members 33a and 33b are applied with the operating forces from the operating members 32a and 32b, respectively, and thus pivoted about the second pivots 35a and 35b, respectively, in the directions of arrows $c_1$ and $c_3$, respectively, to transmit the operating forces to the guide members 31a and 31b, respectively, in the moving directions of the latter. That is, since the transmission members 33a and 33b are curved at the portions near the couplings 44, respectively, of the guide members 31a and 31b outwardly of the cartridge body 6 in relation to straight lines $l_2$ and $l_3$, they can transmit the operating forces to the guide members 31a and 31b, respectively, in the moving directions of the latter.

In the disc cartridge 1 constructed as in the above, information is written to or from the optical disc 5 encased in the cartridge 1 as will be described below with reference to the accompanying drawings:

First, the disc cartridge 1 is set into the cartridge loader in the recorder/player with the access opening 21 and drive opening 22 being closed by the shutter plates 25 and 26 as shown in FIG. 3.

When the disc cartridge 1 is set in the cartridge loader, the shutter operator (not shown) of the recorder/player will move the operating members 32a and 32b of the shutter open/close mechanism 27 in the direction of arrow $b_2$. As shown in FIG. 13, as the operating members 32a and 32b in the shutter open/close mechanism 27 are thus moved in the direction of arrow $b_2$, the transmission member 33a and 33b are pivoted to move the guide members 31a and 31b in and along the guide recesses 36a and 36b, respectively, in the direction of arrow $a_2$. Since the guide members 31a and 31b are thus moved in the directions of arrows $a_2$ and $a_4$, the shutter plates 25 and 26 are moved in the directions of arrows $a_2$ and $a_4$, respectively, to open the access opening 21 and drive opening 22.

Then, the disc table of the disc rotation drive mechanism of the recorder/player enters the disc cartridge 1 from the drive opening 22 to drive the optical disc 5 (this is not illustrated), while the optical pickup 100 of the recorder/player having entered into the disc cartridge 1 from the access opening 21 is moved radially of the optical disc 5 to write and read information to and from the optical disc 5, as shown in FIG. 12.

As having been described in the foregoing, the guide recesses 36a and 36b formed in the main side of the cartridge body 6 obliquely relative to the width of the cartridge body 6 in the disc cartridge 1 allow to freely shape the front end 20 of the cartridge body 6, at which the disc cartridge 1 is first inserted into the recorder/player. Thus, since it is possible to easily know the correction direction of inserting the cartridge 6 into the recorder/player, the disc cartridge 1 cannot be inserted in any wrong direction into the recorder/player.

As having been described in the foregoing, since the shutter open/close mechanism 27 having the pair of shutter plates 25 and 26 is provided, it is possible to assure a large width of the access opening 21.

In this disc cartridge 1 according to the present invention, since the shutter open/close mechanism 27 has the transmission members 33a and 33b pivotably connected to the guide members 31a and 31b and operating members 32a and 32b by means of the first and second pivots 34a and 34b and 35a and 35b, respectively, the pair of shutter plates 25 and 26 can be moved to positively open and close the access opening 21 and drive window 22.

Further, in the disc cartridge 1, since the shutter open/close mechanism 27 is located outside the upright walls 17 and 18 of the disc compartment 16 and in the space isolated from the disc compartment 16, abrasion powder produced as the guide members 31a and 31b, operating members 32a and 32b and transmission members 33a and 33b are slid repeatedly is prevented to come into the disc compartment 16, whereby information can be written and read to and from the optical disc 5 with a highly improved reliability.

Figure 14:
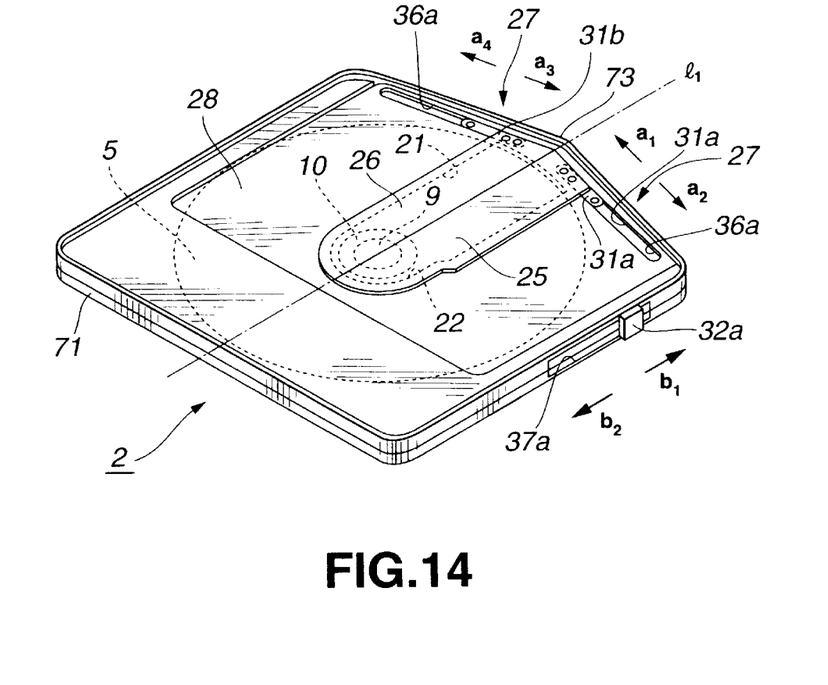
FIG. 14 is a perspective view a variant of the disc cartridge according to the present invention.

Note that the front end 20 of the aforementioned disc cartridge 1 is formed circular convexly in relation to the recorder/player but may of course be formed in any other shape as shown in FIG. 14 for example. This variant of the disc cartridge according to the present invention, having the front end thereof formed otherwise than in the above, will briefly be described below with reference to FIG. 14. The same elements and portions in this variant shown in FIG. 14 as those in the disc cartridge 1 having been described in the foregoing will be indicated with the same references for the convenience of illustration and will not be described any further.

As shown in FIG. 14, the other disc cartridge 2 is only different from the aforementioned embodiment in that the cartridge body 71 has the front end 73 thereof formed generally symmetrically triangular with respect to the center line $l_1$ of the width of the cartridge body 71. Therefore, owing to this front end shape, the user can easily know visually and by touching the correct direction of inserting the disc cartridge 2 into the reorder/player.

In the aforementioned disc cartridges 1 and 2, the front ends 20 and 73 are formed symmetrically circular and/or polyhedral with respect to the center line $l_1$ of the width of the cartridge bodies 6 and 71 but the front end may be formed asymmetrical with respect to the center line $l_1$.

Figure 15:
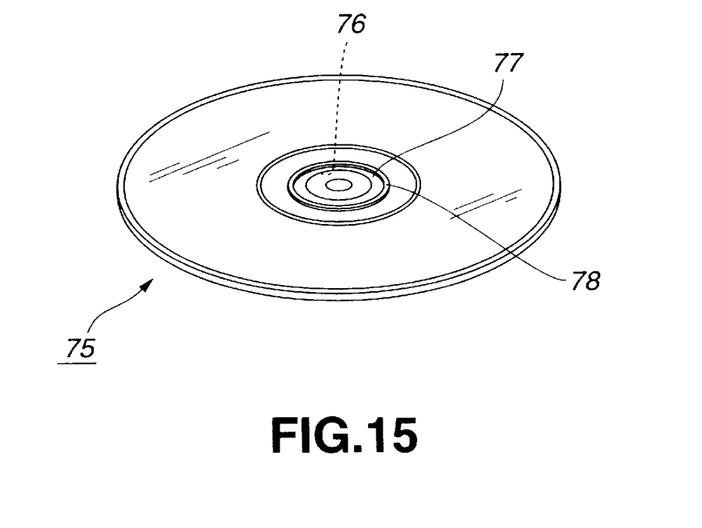
FIG. 15 is a perspective view of another optical disc.

Also, in the above disc cartridges 1 and 2, the cartridge bodies 6 and 71 have the compartment 23 defined by the annular projection 24, in which the chucking plate 10 is provided to hold the optical disc 5. However, it should be noted that as shown in FIG. 15, there may be fixed over a center hole 76 of an optical disc 75 a chucking plate 77 around which an annular projection 78 is formed.

In the disc cartridges 1 and 2, the shutter plates 25 and 26 are provided exposed to outside. However, a shutter cover may be provided to cover the moving range of each the shutter plates 25 and 26. This variant of the disc cartridge according to the present invention will be described below with reference to the accompanying drawings. Note that the same elements in this second variant in FIGS. 16 and 17 as those in the disc cartridges 1 and 2 will be indicated with the same references as in the aforementioned disc cartridges 1 and 2 and will not be described any further.

Figure 16:
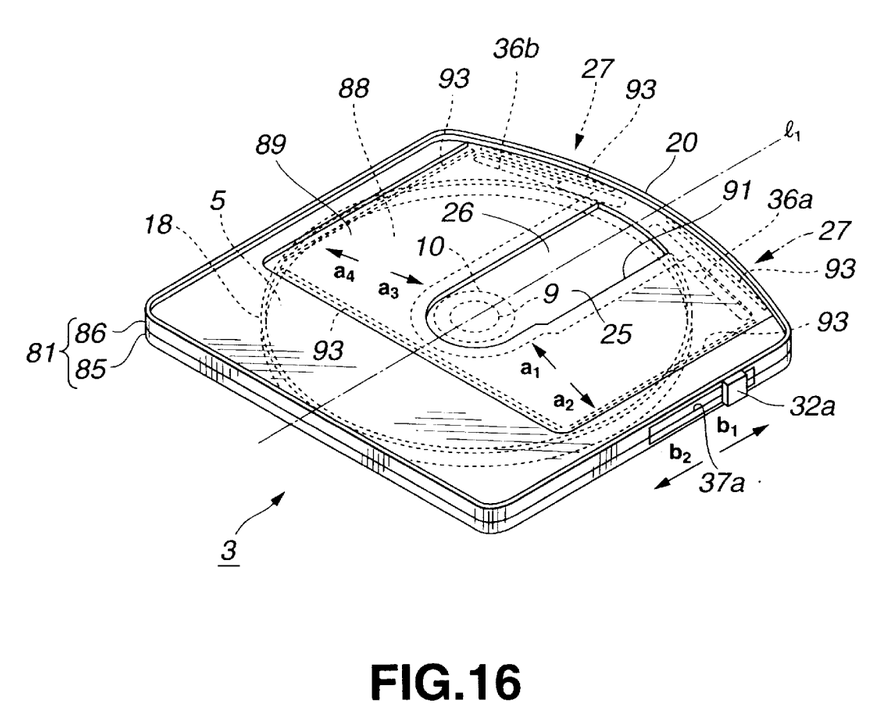
FIG. 16 is a perspective view of another variant of the disc cartridge according to the present invention.
Figure 17:
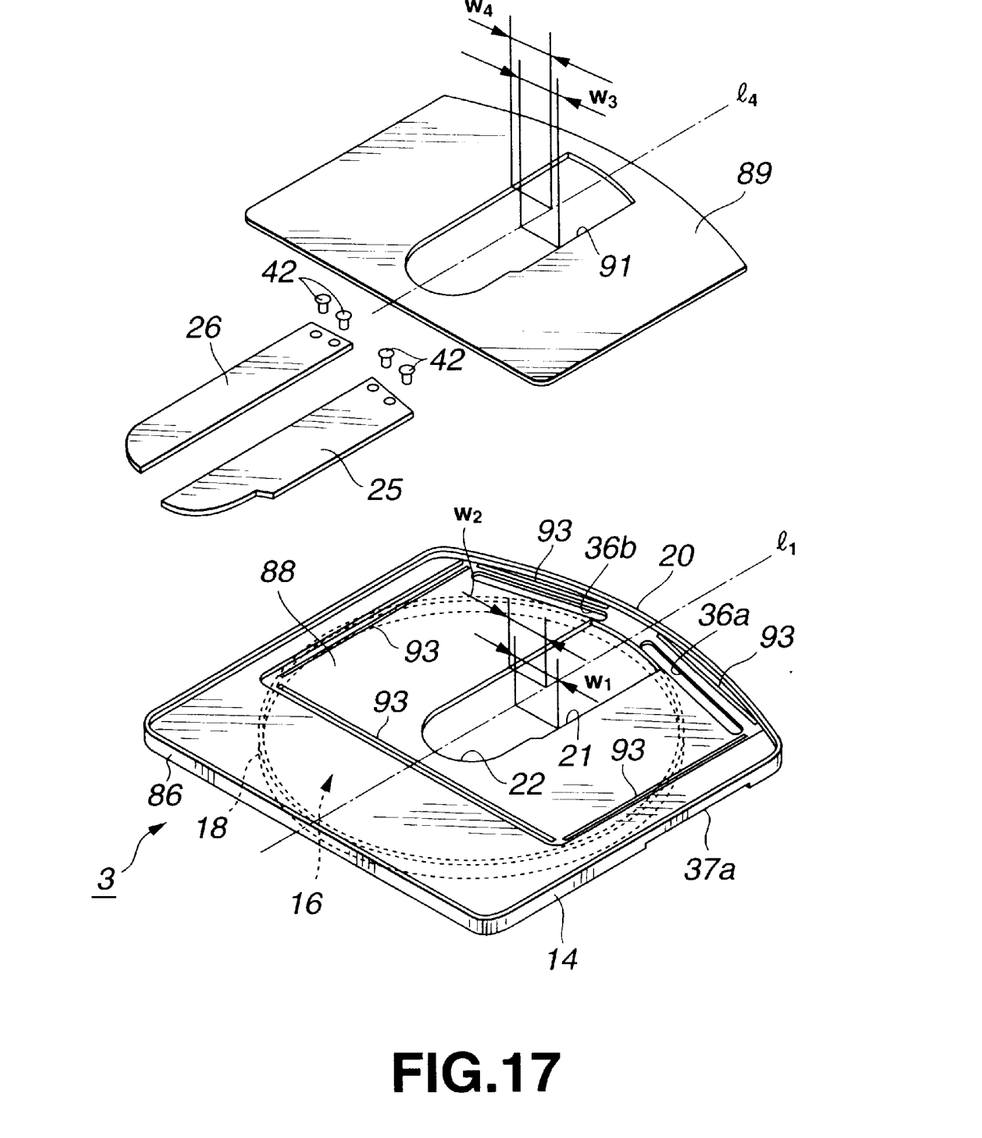
FIG. 17 is an exploded perspective view of the disc cartridge in FIG. 16.

As shown in FIGS. 16 and 17, the variant of the disc cartridge is generally indicated with a reference 3, and includes a cartridge body 81 formed from a set of upper and lower shells 85 and 86. In the cartridge body 81, the upper shell 85 has formed thereon a concavity 88 in which the shutter plates 25 and 26 are movable, as shown in FIGS. 16 and 17. Further, the disc cartridge 3 includes a shutter cover 89 to cover the concavity 88 as shown in FIGS. 16 and 17.

The concavity 88 in which the shutter plates 25 and 26 are movable is slightly larger in area than the moving range of each of the shutter plates 25 and 26 moving over the access opening 21 and drive opening 22 and deeper than the thickness of the shutter plates 25 and 26 so that the latter will not protrude to above the main side of the cartridge body 81.

The shutter cover 89 is formed from a resin such as polycarbonate or a metal such as stainless steel, aluminum or the like to be generally rectangular and flat. The shutter cover 89 is 0.2 to 0.5 mm thick. As shown in FIGS. 16 and 17, the shutter cover 89 has an opening 91 formed in the main side thereof and in a position corresponding to the access opening 21 and drive opening 22. The opening 91 is somehow larger in area than the access and drive openings 21 and 22 and slightly smaller in area than the shutter plates 25 and 26.

As shown in FIG. 17, the opening 91 is formed asymmetrical with respect to a center line $l_4$ of the width of the shutter cover 89, coincident with the center line $l_1$. More specifically, the opening 91 is formed to have an area to the right of the center line $l_4$ and an area to the left of the center line $l_4$, and the right area of the opening 91 has a width $w_3$ and the left area has a width $w_4$, as shown in FIG. 17. The width $w_3$ is a little larger than the width $w_4$.

The shutter cover 89 is attached in the concavity 88 with an adhesive tape 93 having an adhesive layer on either side thereof or an adhesive applied on the inner side thereof facing the bottom of the concavity 88 along the peripheral edge thereof. The adhesive tape 93 has a predetermined thickness which will assure a predetermined gap in which the shutter plates 25 and 26 can be moved inside the concavity 88. The shutter cover 89 thus attached in the concavity 88 covers the moving range of the shutter plates 25 and 26 and guide recesses 36*a* and 36*b* of the shutter open/close mechanism 27.

In the above disc cartridge 3, since the shutter cover 89 is provided as in the above to cover the moving range of the shutter plates 25 and 26, it is possible to prevent dust from coming into the cartridge body 81 from the clearance between the shutter plates 25 and 26 and cartridge body 81 when the shutter plates 25 and 26 is covering the access opening 21 and drive opening 22. Also in the disc cartridge 3, since the guide recesses 36*a* and 36*b* are covered by the shutter cover 89, it is possible to prevent dust from coming into the cartridge body 81 from the guide recesses 36*a* and 36*b*. Therefore, in the disc cartridge 3, information can be written or read to or from the magneto-optical disc 5 with an improved reliability.

The aforementioned disc cartridges 1, 2 and 3 are designed such that the optical pickup approaches the optical disc through the access opening 21. However, it is should be noted that there may be provided in a position opposite to the access opening 21 another access opening through which a magnetic field application head or the like comes in and another shutter plate to open and close the access opening.

What is claimed is:

1. A disc-shaped recording medium;

a cartridge body having formed therein a disc compartment to house the disc-shaped recording medium;

an access opening formed in the cartridge body and through which a part of the recording area of the disc-shaped recording medium, extending between lead-in and lead-out areas, is exposed outside for data read and write;

a pair of shutter members provided movably towards and away from each other to open and close the access opening;

a shutter open/close mechanism having a pair of guide recesses formed in a main side of the cartridge body obliquely in relation to the width of the cartridge body to support the pair of shutter members, respectively, to be movable;

a guide member supporting the shutter member and movably engaged in the guide recess;

an operating member to move the guide member;

a transmission member connecting the guide member and operating member to each other to transmit an operating force from the operating member to the guide member; and support surfaces formed on the cartridge body to support the operating member moveably;

the operating member being disposed at a lateral side of the cartridge body, generally perpendicular to the moving direction of the shutter member.

2. The disc cartridge as set forth in claim 1, wherein the cartridge body is formed circular and/or polyhedral at the front end thereof at which the disc cartridge is first inserted into a recorder/player.

3. The disc cartridge as set forth in claim 1, wherein in the shutter open/close mechanism, the pair of guide recesses are formed symmetrical with respect to the center line of the width of the access opening.

4. The disc cartridge as set forth in claim 1, wherein the shutter open/close mechanism has guide members provided movably in the guide recesses, respectively, to support the shutter members, and the guide members abut the ends of the guide recesses, respectively, to lock the shutter members against moving.

5. The disc cartridge as set for in claim 1, wherein the cartridge body has formed therein concavities in which the pair of shutter members are moved respectively, and a shutter cover which covers the moving ranges of the pair of shutter members.

6. The disc cartridge as set forth in claim 1, wherein the access opening is formed asymmetrical with respect to the center line of the width of the cartridge body.

\* \* \* \* \*